United States Patent

[11] 3,585,396

| [72] | Inventors | James M. Ferguson<br>Eau Gallie;<br>Ralph P. Means, Melbourne, both of, Fla. |
|---|---|---|
| [21] | Appl. No. | 812,222 |
| [22] | Filed | Apr. 1, 1969 |
| [45] | Patented | June 15, 1971 |
| [73] | Assignee | Mohawk Data Sciences Corporation<br>Herkimer, N.Y. |

[54] APPARATUS AND METHOD FOR SENSING PERFORATIONS IN A PERFORATED MEMBER
5 Claims, 6 Drawing Figs.

| [52] | U.S. Cl. | 250/227,<br>250/219, 235/61.11 |
|---|---|---|
| [51] | Int. Cl. | G08c 9/06 |
| [50] | Field of Search | 250/227,<br>219; 235/61.12, 61.115 |

[56] References Cited
UNITED STATES PATENTS

| 3,046,407 | 7/1962 | Hoffman | 250/219 |
|---|---|---|---|
| 3,124,675 | 3/1964 | Epstein | 250/227 |
| 3,278,754 | 10/1966 | Wallace | 250/219 |
| 3,431,426 | 3/1969 | Laidlaw | 250/219 |

*Primary Examiner*—Walter Stolwein
*Attorneys*—Francis J. Thomas, Richard H. Smith, Thomas C. Siekman and Sughrue, Rothwell, Mion, Zinn and MacPeak

ABSTRACT: An apparatus and method for sensing perforations in a perforated member by illuminating a surface of the perforated member at a read station and thereby passing light through any perforations present there. Some of the light passing through each perforation is reflected back through the perforation it previously passed through and onto a photocell. Fiber-optic bundles are utilized to guide light from a light source to the read station and from the read station to the photocells once the light has been reflected and passed back through the perforations.

INVENTORS
JAMES M. FERGUSON
RALPH P. MEANS
BY,

Thomas C. Sickman
ATTORNEY 3,585,396

APPARATUS AND METHOD FOR SENSING PERFORATIONS IN A PERFORATED MEMBER

BACKGROUND OF THE INVENTION

This invention relates to an apparatus and method for sensing perforations in a perforated member and, more particularly, for photoelectrically sensing such perforations.

Several ways of sensing data-indicating perforations in a perforated member are known. Brushes have been used which contact a surface of the perforated member and pass through any perforations present to engage contacts on the opposite side of the perforated member and produce electrical signals. Other mechanisms utilize sensing pins which move toward the perforated member during a sensing operation so that those pins finding perforations pass through the perforated member and actuate electrical contacts. Mechanisms using star wheels have also been used. These wheels roll along the top of the perforated member such that the axis of a wheel is lowered when one of its points enters a perforation and an electrical signal is generated.

However, because of their mechanical elements these devices are relatively slow. They also require electrical contacts which gradually erode and are a frequent cause of failure. In addition, they tend to damage the perforated member after repeated passes.

Photoelectric sensing mechanisms overcome these problems. Generally, with these devices beams of light, directed toward photocells, are interrupted at all times by the perforated member except when perforations occur in the light paths. However, with a reflective perforated member as punched aluminum-backed mylar tape, in some of these sensing mechanisms the light may be reflected by the tape and cause the photocells to generate incorrect signals. Fingerprints or written data on a perforated member may also be reflective and thus confuse the photocells.

SUMMARY OF THE INVENTION

In accordance with the invention, perforations in a perforated member are sensed at a read station by illuminating a surface of the perforated member to pass light through any perforations there present. Light passing through each perforation is reflected back through the perforation it previously passed through and onto a photosensing means adjacent the perforated member's illuminated surface. The means for illuminating the surface of the perforated member, the reflecting means, and the photosensing means are located with respect to the perforated member and with respect to each other such that substantially only that light from the illuminating means which is reflected by the reflecting means reaches the photosensing means.

Thus the photosensing means in the invention cannot be confused by light reflected by a reflective perforated member.

The preferred embodiment of the invention includes light-conducting elements which guide light from a light source to the read station, and from the read station to a plurality of photocells. This allows for the remote location of the light source and photocells and thus simplifies the design at the read station. In addition, to allow for easy installation and removal of the tape, it is clamped in place at the read station by a moveable member containing only the light-conducting elements and requiring no electrical wiring within it. The use of light-conducting elements also allows a single light source to be utilized regardless of the number of perforations to be simultaneously sensed.

DESCRIPTION OF THE PREFERRED EMBODIMENT

Figure 1:
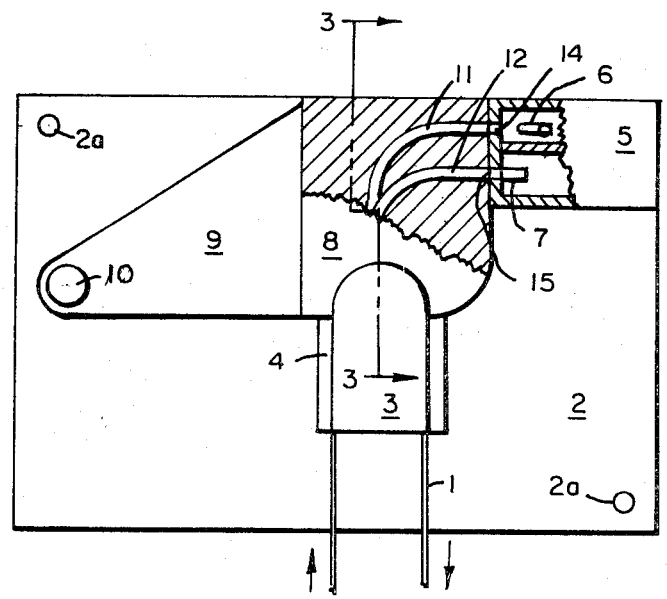
FIG. 1 is an elevation view, partly in section, showing a preferred embodiment of the invention.

In FIG. 1 a tape reader is shown sensing data-indicating perforations in a moving punched tape 1. The reader comprises a panel 2 having mounting holes 2a. Mounted on the panel is a hollow tape support 3 having a convex circular surface over which the tape moves. At the top of the convex surface is an area in which the perforations in the tape are sensed and which is designated the read station. An edge of the tape bears against and is guided by a plate 4, located between the panel 2 and the tape support 3, which serves to space the tape from the panel. At its upper right corner the panel has a housing 5 mounted thereon. The housing contains two separate compartments: a lamp compartment for housing a light source 6, and a sensor compartment for housing eight photocells 7. The reader also contains a tape depressor for clamping the tape 1 over the tape support 3. The tape depressor comprises a main portion 8 and an arm 9 pivotally mounted on the panel 2 with a pin 10. The main portion 8 of the tape depressor is shown partly in section to expose bundles of fiber optic tubes, 11 and 12, leading from the housing 5 to the read station at the tape support 3. Any of the well-known fiber-optic elements may be used. As illustrated, the main portion 8 has a concave surface which mates with the tape support's convex surface.

Figure 2:
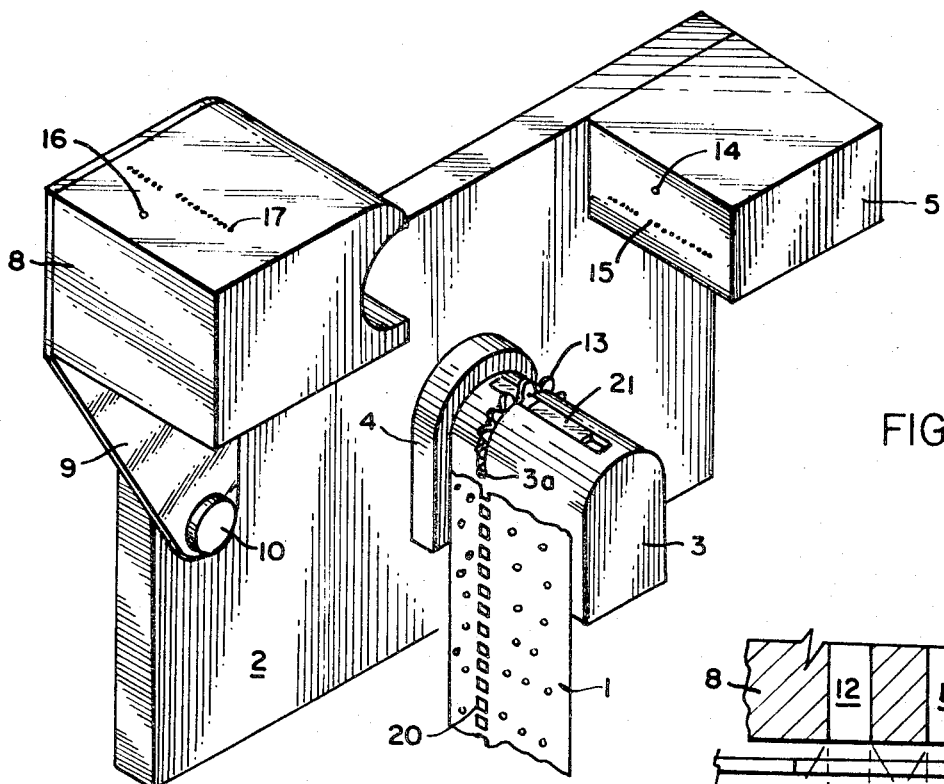
FIG. 2 is a perspective view of the apparatus shown in FIG. 1 when not in use.

FIG. 2 shows the reader with the tape depressor pivoted upwardly and in a position allowing easy removal or placement of the tape in the reader. A sprocket wheel 13 protruding through an aperture 3a in the tape support 3 may be seen. The sprocket wheel is of the same diameter as the convex surface of the tape support 3 and, by rotating about its axis within the tape support, moves the tape over the convex surface and past the read station. FIG. 2 also shows an opening 14 adjacent the light source and eight openings 15 adjacent the photocells in the housing 5. An input port 16 and eight output ports 17 in the tape depressor are also shown. These ports communicate with the openings in the housing when the tape depressor is in the position shown in FIG. 1 where it is positioned adjacent the read station, clamps the tape over the tape support 3 and abuts the housing 5.

Figure 3:
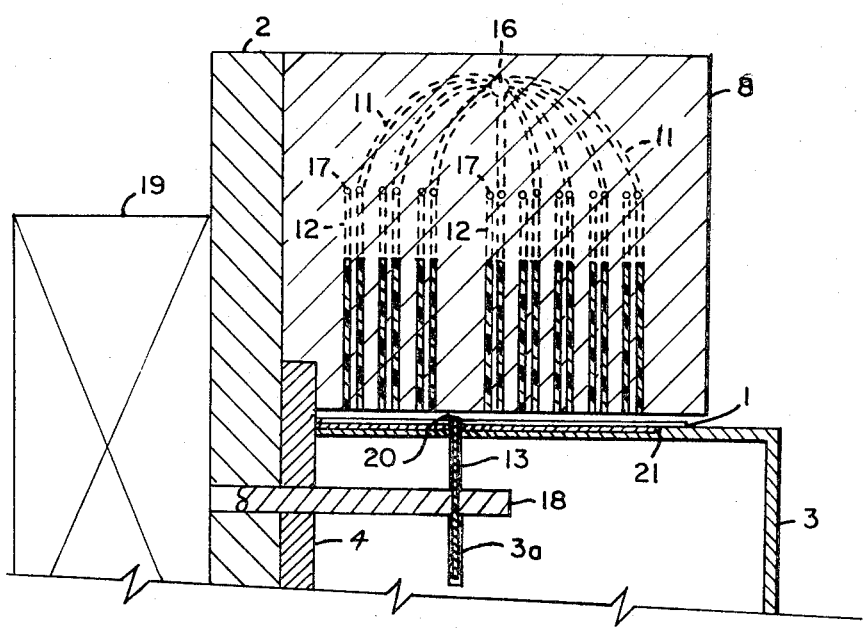
FIG. 3 is a section taken along line 3-3 of FIG. 1.

FIG. 3 is a section through the read station and illustrates the operation of the reader. The sprocket wheel 13 is located around the periphery of a drive shaft 18 which is connected to a step motor 19 (schematically illustrated) secured to the opposite side of the panel 2. Incremental rotation of the shaft 18 and the sprocket wheel 13 moves the tape since the teeth of the sprocket wheel coincide with sprocket holes 20 in the tape. A mirror 21 is mounted within the convex surface of the tape support 3 at the read station. The reflecting surface of the mirror is flat and positioned substantially parallel to the tape.

During operation, the fiber-optic bundles 11 and 12 extend between the tape at the read station and the housing 5. There are eight bundles designated 11 and they communicate with the input port 16 of the tape depressor and guide light from the light source 6 to the read station where they illuminate the top surface of the tape. There are also eight bundles designated 11. Each of these communicates with one of the eight output ports 17 of the tape depressor and guides light from the read station to a photocell 7. Thus the fiber optic bundles 11 are for lighting purposes and the bundles 12 are for sensing purposes. The tape 1 has eight channels arranged across its width, each containing data-indicating perforations which are sensed by a lighting and sensing bundle cooperating with each other.

Figure 4:
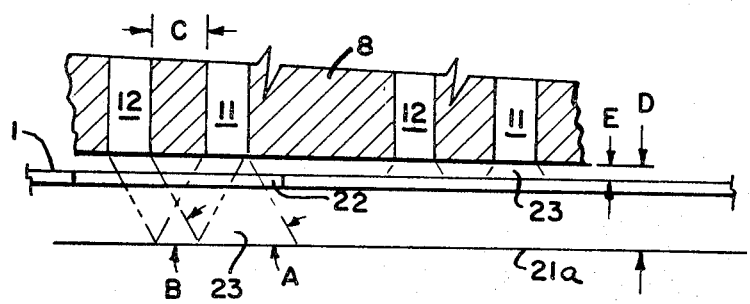
FIG. 4 is a schematic enlarged view of a portion of FIG. 3 and illustrates the invention.

The left side of FIG. 4 illustrates the arrangement of the tape 1, mirror 21, and a cooperating pair of fiber optic bundles, 11 and 12, at the read station. The lighting bundle 11 directs a light beam 23 onto the top surface of the tape 1 with its centerline perpendicular to the tape. If a perforation 22 is present at the read station the light passes through it. Because of the angle of divergence A of the light beam 23 from the lighting bundle 11, some light is reflected by the flat reflecting surface 21a of the mirror 21 back through the perforation 22 to a sensing bundle 12. Each time a perforation occurs at the read station, the light is thus reflected and a photocell 7 receives light indicating the presence of a perforation. The photocell then converts the light to an electrical output. Of course, when no perforation is present at the read station, light cannot reach the mirror to be reflected into the sensing bundle 12.

For proper operation of the reader, the lighting and sensing bundles and mirror must be correctly located with respect to each other and with respect to the tape. For example, in FIG. 4 the angle of divergence A of the light 23 is 30°. The angle B at which the sensing bundles will accept light is also 30°. The distance C between the cooperating bundles, 11 and 12, is 0.02 inch. With these dimensions, the distance D between the end of the bundles and the reflecting surface 21a of the mirror must be a minimum of 0.018 inches for reflection to a sensor bundle 12. Additionally, if the tape is reflective, the distance E from the end of the bundles to the reflecting surface of the tape has a maximum limit of 0.010 inch. As illustrated at the right side of FIG. 4, this maximum limit prohibits reflection of light 23 into a sensing bundle 12 by the tape.

Figure 5:
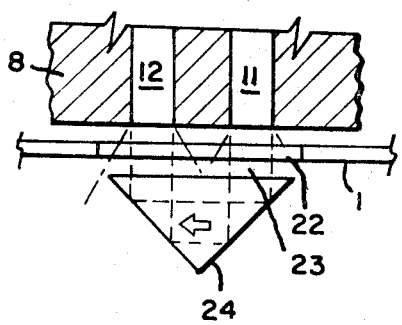
FIGS. 5 and 6 are schematics, similar to FIG. 4, but illustrating alternate embodiments of the invention.
Figure 6:
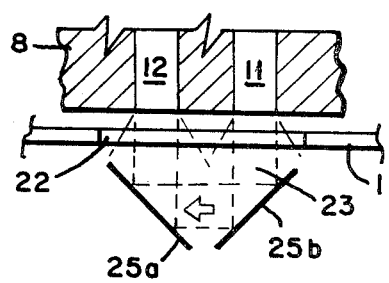

FIGS. 5 and 6 illustrate two alternate embodiments which provide stronger light signals to the photocells but are more complex and thus expensive than the arrangement shown in FIG. 4. In FIG. 5, a 90° prism 24, commonly termed a Porro prism, is used to reflect light from each lighting bundle 11 back to its cooperating sensing bundle 12. In FIG. 6, two mirrors, 25a and 25b, disposed at 45° to the tape 1 and 90° to each other are used.

Thus, the data-indicating perforations in each of the tape's channels are sensed by light from a fiber-optic bundle 11 illuminating a surface of the tape within the channel and passing through perforations present at the read station. Some light passing through each perforation is reflected back through the perforation it previously passed through and into a fiber-optic bundle 12 which guides the light to a photocell 7.

We claim:

1. Apparatus for sensing perforations in a perforated member at a read station, the apparatus comprising:
    a. at least one illuminating means;
    b. at least one photosensing means;
    c. a movable member adapted to be simultaneously positioned adjacent the read station, the illuminating means and the photosensing means;
    d. at least one light-conducting element located within the movable member and adapted to guide light from the illuminating means onto a surface of the perforated member at the read station when the movable member is positioned adjacent the read station, whereby light is passed through perforations at the read station;
    e. reflecting means for reflecting light passing through perforations at the read station such that at least some of the light passing through each perforation is reflected back through the perforation it previously passed through; and
    f. at least one additional light-conducting element located within the movable member and adapted to guide light which has been reflected by the reflecting means back through a perforation to the photosensing means.

2. The apparatus as recited in claim 1 wherein the perforated member is a punched tape moving past the read station, and further comprising:
    a. a panel on which the movable member is movably mounted;
    b. a supporting member secured to the panel for supporting the tape at the read station, the supporting member having a convex surface in which the read station is located, the movable member having a concave surface adapted to mate with the convex surface; and
    c. a housing mounted on the panel, the housing containing a compartment which encloses the illuminating means and has at least one opening adapted to communicate with the light-conducting element for guiding light to the read station, the housing also having a compartment which encloses the photosensing means and has at least one opening adapted to communicate with the light-conducting element for guiding light to the photosensing means.

3. The apparatus as recited in claim 1 wherein:
    a. the reflecting means comprises a flat member positioned substantially parallel to the perforated member at the read station; and
    b. each light-conducting element for guiding light from the light source is adapted to direct a beam of light having its centerline perpendicular to the reflecting means, the angle of divergence of the light beam being such that light in the beam reaches one of the light-conducting elements for guiding light to the photosensing means by being reflected from the reflecting means through a perforation at the read station.

4. The apparatus as recited in claim 1 wherein the reflecting means comprises at least one Porro prism.

5. The apparatus as recited in claim 1 wherein the reflecting means comprises at least one pair of flat members which are arranged at 90° with each other and 45° with the perforated member.